3,146,811
INTERRUPTIBLE DRIVE CONNECTION
John W. Shryock, Indianapolis, Ind., assignor to Western
Electric Company, Incorporated, a corporation of New
York
Filed June 15, 1961, Ser. No. 117,316
4 Claims. (Cl. 144—32)

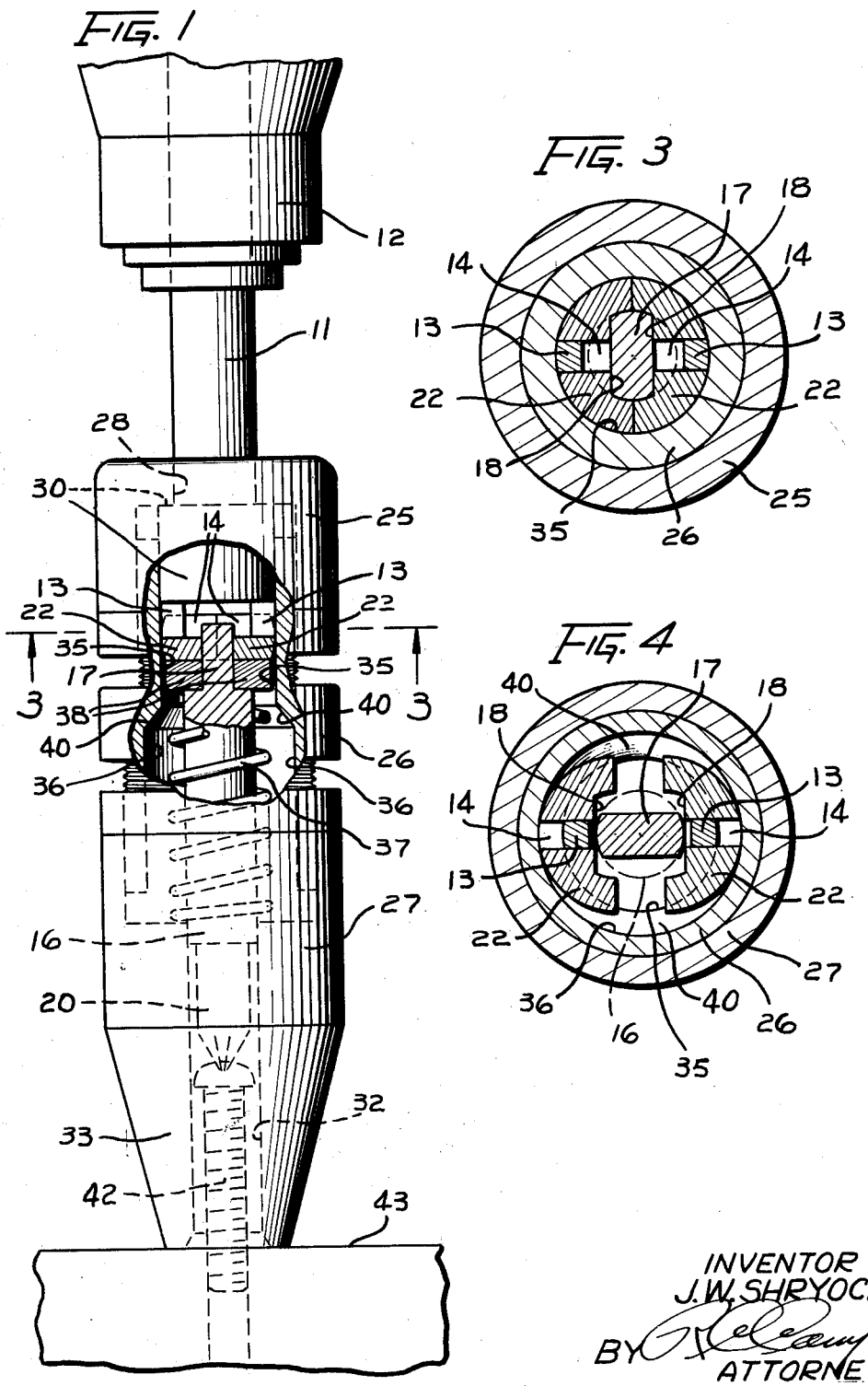

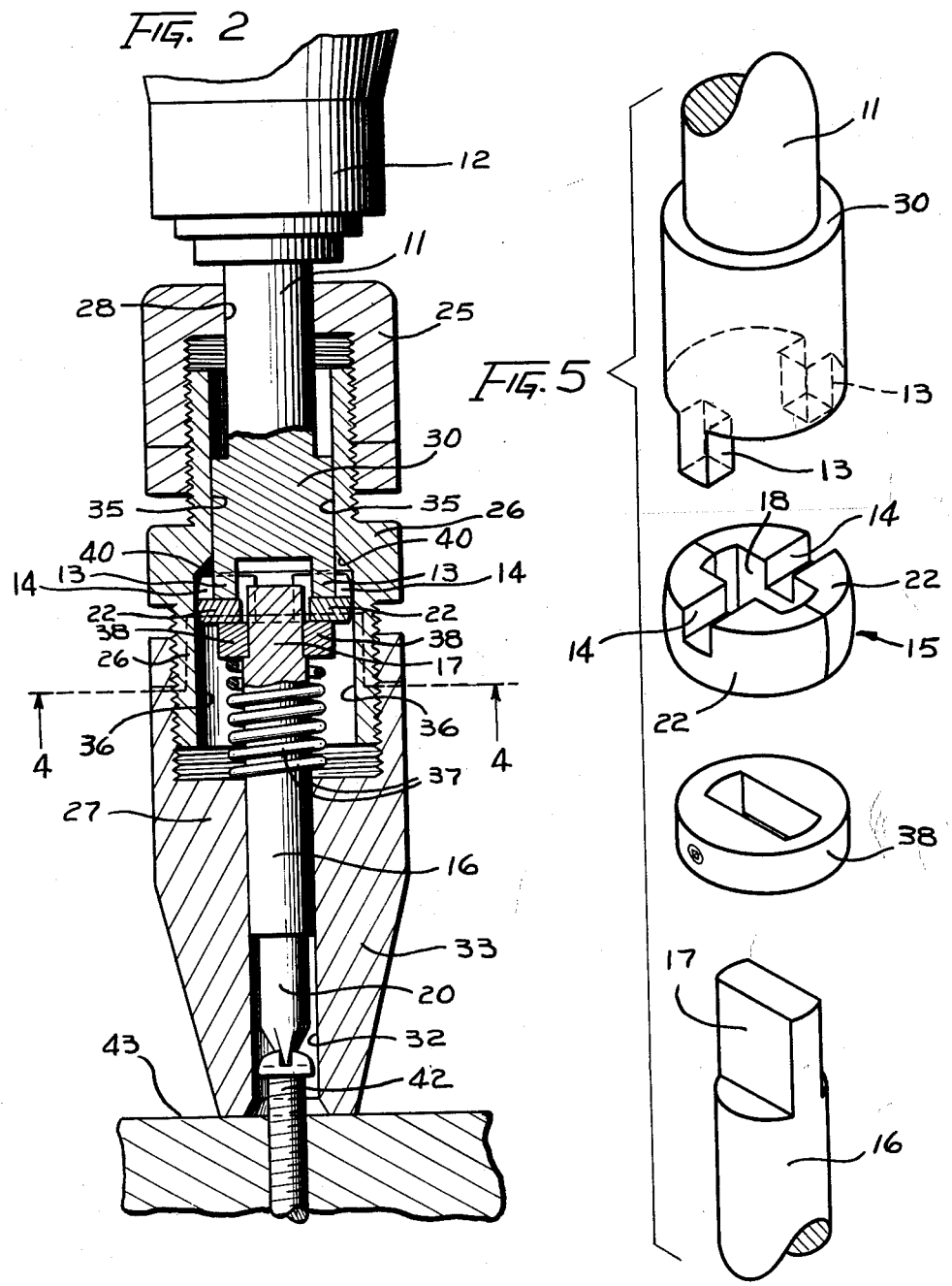

This invention relates to an interruptible drive connection and more particularly to a split collar clutch for drivingly connecting a driving member to a driven member and arranged to release the connection in response to axial movement of the clutch through a predetermined distance.

In the preferred embodiment of the invention, a split collar clutch drivingly connects a driving member to a driven member The clutch has a central, rectangular slot disposed therein which is bisected by the split in the collar and which is arranged to receive and normally drivingly engage an axially extending tang of the driven member. The clutch also has a radial slot extending transverse to the split in the collar and which is arranged to receive and to drivingly engage at all times a pair of axially extending finger elements of the driving member. The split sections of the clutch are movable radially apart and away from the driven member, and the clutch is arranged within a tubular housing which has two sections of different internal radii connected by an inclined or generally conical surface. A biasing spring exerts an axial force against the clutch to retain the clutch normally in the section of the tubular housing having the smaller radius, wherein the split sections of the clutch are retained substantially in engagement with each other, and in driving engagement with the driven member. When the split collar is moved axially into the section of the tubular housing having the larger radius, against the force of the biasing spring, the two sections of the split collar move radially apart with respect to each other and out of engagement with the tang of the driven member, so that the driving member is no longer drivingly connected to the driven member.

The invention is particularly applicable to incorporation in a power operated screwdriver for driving screws to a prescribed depth. In such case, the split collar is arranged to advance with the screw while the associated tubular housing is fixed with respect to the member into which the screw is being inserted.

An object of this invention resides in an improved, simple, and economical interruptible drive connection.

Another object of the invention is to provide an improved interruptible drive connection which is controlled accurately in response to relative axial movement of two portions thereof.

A further object of the invention is to provide an improved interruptible drive connection which is adjustably controlled in response to relative axial movement of two portions thereof.

A still further object of the invention is to provide an improved power operated screwdriver for driving screws only to a prescribed depth.

An additional object of this invention resides in an improved releasable split collar clutch, positioned within a tubular housing, for drivingly connecting a driving member to a driven member, wherein the connection between the driven member and the driving member is released when the sections of the split collar are caused to move radially apart in response to axial movement thereof through a predetermined distance.

Other objects and advantages of the invention will become apparent by reference to the following detailed description thereof and the accompanying drawings illustrating a preferred embodiment thereof, in which:

FIG. 1 is a sectional view of an interruptible drive connection embodying the principal features of the invention;

FIG. 2 is a sectional view of the interruptible drive connection of FIG. 1 illustrating the drive connection in an interrupted position;

FIG 3 is a cross-sectional view taken along the lines 3—3 of FIG 1 illustrating the releasable split collar clutch in the driving position;

FIG. 4 is a cross-sectional view taken along the lines 4—4 of FIG. 2 illustrating the releasable split collar clutch in the released position; and FIG. 5 is an exploded perspective view of a driving member, a driven member, and a releasable split collar clutch for connecting the driving member to the driven member. The releasable split collar clutch is illustrated in the drawings as utilized in a power driven screwdriver. It is to be understood that the invention is not limited to such an application, but is of broad applicability.

Referring now in detail to the drawings and more specifically to FIGS. 1, 2 and 5, a driving shaft 11 is rotatably driven by a suitable rotating drive means 12. The lower extremity of the driving shaft is bifurcated to form a pair of axially extending fingers 13 which are slidably received in a slot 14 in a split collar clutch 15 (see FIG. 5) and thereby drivingly connect the driving shaft to the split collar clutch.

The split collar clutch is also drivingly connected to a driven shaft 16 and thus drivingly connects the driving shaft 11 to the driven shaft 16. One extremity of the driven shaft is constructed to form an axially extending rectangular tang 17 which is received in a rectangular aperture 18 of the split collar clutch, and a screwdriver bit 20 is shown mounted in a bore in the opposite extremity of the driven shaft.

The split collar clutch 15 comprises a pair of symmetrical half-circle clutch elements 22 (FIGS. 3, 4, and 5) which define the rectangular aperture 18 for receiving the tang 17 of the driven shaft 16. These clutch elements are movable radially apart and away from the driven shaft since the rectangular aperture 18 is intersected by the line of engagement of the pair of clutch elements. The slot 14 in the split collar clutch for receiving the finger elements 13 of the driving shaft 11 extends radially transverse to the line of engagement of the clutch elements. Since the fingers 13 are slidably received in the slot 14, the clutch elements 22 are free to move radially with respect to the driving shaft.

The driven shaft 16, the split collar clutch 15, and the bifurcated end of the driving shaft 11 are contained within an outer housing that is divided into three sections: an upper section 25, a main central section 26, and a lower section 27. The upper section 25 has a bore 28 in one end through which the driving shaft 11 passes, and its opposite end is threadably connected to the main central section 26. The bifurcated extremity of the driving shaft has a shoulder 30 which prevents this extremity from passing through the bore 28.

The lower housing section 27 has a work-engaging nose 33 at its lower extremity, and has a bore 32 within which the driven shaft 16 and the screwdriver bit 20 are axially movable, and its opposite extremity is threadably connected to the central connector section 26.

The central connector section 26 has a bore having two sections 35 and 36 of different radii connected by an inclined or generally conical surface 40. The split collar clutch 15 is arranged to ride within these bore sections 35 and 36, and the inclined surface 40 permits the split collar clutch to move from one section to the other.

The split collar clutch is normally retained in the upper bore section 35 having the smaller radius by a biasing spring 37 which is positioned around the driven shaft 16 and exerts a biasing force between the nose 33 of the lower housing section 27 and a collar 38 on the driven shaft. This biasing force is transmitted through the collar 38 of the driven shaft to the split collar clutch 15 and through the split collar clutch to the driving shaft 11 so that the shoulder 30 of the driving shaft is normally retained against the end wall of the upper housing section 25. When the split collar clutch is positioned in the bore section 35 having the smaller radius, the clutch elements 22 are retained substantially in engagement with each other and in driving engagement with the driven shaft, whereby the driven shaft 16 is drivingly connected to the driving shaft 11 through the split collar clutch (see FIG. 3).

In operation, an external force is applied to the driving shaft to impart axial movement thereto, so that a screw 42 may be driven a predetermined depth into a workpiece 43. The force of the biasing spring 37 is overcome by this external axial force and the split collar clutch 15 is caused to move axially within the bore of the central housing section 26 until the screwdriver bit 20 engages the screw 42.

When the drive means 12 is actuated, the screw 42 is rotated and the split collar 15 advances along the bore section 35 and onto the inclined surface 40. As the split collar advances along the latter inclined or conical surface, the clutch elements 22 are moved farther and farther apart by centrifugal force until driving engagement of the split collar and the driven shaft is interrupted. The driving shaft continues to drive the split collar clutch since the finger elements 13 of the driving shaft are slidably received in the slot 14 of the clutch, and they are held in engagement by the opposing forces of the biasing spring and the external axial force. The connection between the clutch and the driven shaft, however, is released since the clutch elements are far enough apart that the tang 17 of the driven shaft is no longer engaged by the clutch elements.

The upper housing section 25 is threadedly adjustable with respect to the main central section 26, whereby the screwdriver bit 20 may be positioned a predetermined distance from the outer extremity of the bore 32 in the work-engaging nose 33 of the lower housing section 27, so that screws of a various length may be accommodated by the apparatus. However, since the tapered bore portion 40 remains at the same height above the workpiece 43, the screwdriver bit 20 will still advance the screw 42 to the same depth before the drive conection is interrupted.

The lower housing section 27 is also threadably adjustable with respect to the central housing section 26, whereby the depth to which a screw can be driven may be preset. Partial unscrewing of the lower housing, for example, moves the nose 33 of the lower housing section farther away from the sloping or tapered bore 40 of the central housing section. The drive connection will then be disconnected while the bit 20 and the head of the screw 42 are at a greater height above the workpiece 43 than previously.

When the apparatus is removed from the screw, the biasing spring 37 exerts an axial force against the collar 38 of the driven shaft 16 and imparts an axial movement to the driven shaft that is transmitted to the clutch 15 and the driving shaft 11. This biasing spring force will cause the driving shaft, the split collar clutch and the driven shaft to be returned to their normal positions so that they are again drivingly connected together. The apparatus is then conditioned to drive another screw into a workpiece.

The embodiment of the invention described above may now be seen to provide an improved, simple, and economical interruptible drive connection which may readily and easily be utilized in power operated apparatus such as a power operated screwdriver. The split collar clutch provides for disconnection of the drive at an accurately controlled level (in response to a precise amount of axial movement of two portions of the apparatus). The level to which the driven member can be driven before disconnection from the driving member is also readily adjustable.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. An interruptible drive connection for releasably connecting a rotary power source to a rotary load device, which comprises a rotary driving member connectible to said power source, a rotary driven member connectible to said load device and coaxial with said driving member, a pair of elements forming a split collar coaxial with said driving and driven members, said elements defining a slot extending along and bisected by the line of engagement of said elements, said slot receiving and having substantially the same cross section as an axially projecting portion on one of the members, said elements being movable radially away from each other and making driving engagement with said one member when said elements are maintained in substantially abutting relationship and permitting free relative rotation of said one member when said elements are moved a substantial distance apart, said elements and the other of said members having cooperating portions defining pin and slot means and providing a continuous driving engagement of said elements and said other member, a sleeve encircling said members and said elements and having a small internal diameter portion for maintaining said elements in substantially abutting relationship and a large internal diameter portion permitting substantial movement of said elements away from each other to interrupt their rotary driving connection with said one member in response to axial movement of said split collar from said small diameter portion to said large diameter portion, and means for retaining said driving and driven members in such relative position axially of each other that axially directed forces may be transmitted between said members when said split collar elements are in either portion of said sleeve.

2. An interruptible drive connection for releasably connecting a rotary power source to a rotary load device, which comprises a rotary driving member connectible to said power source, a rotary driven member connectible to said load device and coaxial with said driving member, a pair of elements forming a split collar coaxial with said driving and driven members, said elements defining a first slot extending along and bisected by the line of engagement of said elements, said slot receiving and having substantially the same cross section as an axially projecting portion on one of the members, said elements being movable radially away from each other and making driving engagement with said one member when said elements are maintained in substantially abutting relationship and permitting free relative rotation of said one member when said elements are moved a substantial distance apart, said elements defining a second slot extending radially transverse to the line of engagement of said elements, said slot receiving and drivingly engaging an axially projecting portion of the other of said members at all times, a sleeve encircling said members and said elements and having a small internal diameter portion for maintaining said elements in substantially abutting relationship and a large internal diameter portion permitting substantial movement of said elements away from each other to interrupt their rotary driving connection with said one member in response to axial movement of said split collar from said small diameter portion to said large diameter portion, and means for retaining said driving and driven members in such relative position axially of each other that axially directed forces may be transmitted between said members when said split collar elements are in either portion of said sleeve.

3. An interruptible drive connection as specified in claim 2 wherein said axially projecting portion of the other of said members includes radially spaced tines slidable within said second slot as said elements move radially together and apart between gripping and releasing conditions.

4. An interruptible drive connection as specified in claim 2 wherein said sleeve has an internal tapered portion connecting said large diameter portion and said small diameter portion for facilitating movement of said elements therebetween, and wherein means are provided which adjustably engage said sleeve and abut a work piece such that said tapered portion is adjustably positionable with respect to the work piece.

References Cited in the file of this patent
UNITED STATES PATENTS

| | | |
|---|---|---|
| 2,684,491 | Roddick | July 27, 1954 |
| 2,790,471 | Graybill | Apr. 30, 1957 |
| 2,940,488 | Riley | June 14, 1960 |